US006697226B1

(12) United States Patent
Narayan et al.

(10) Patent No.: US 6,697,226 B1
(45) Date of Patent: Feb. 24, 2004

(54) DISC DRIVE SUSPENSION HAVING TIP STIFFENER

(75) Inventors: Shri Hari Narayan, Minneapolis, MN (US); Sandeepan Bhattacharya, Bloomington, MN (US); Roger A. Resh, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 205 days.

(21) Appl. No.: 09/822,649

(22) Filed: Mar. 30, 2001

Related U.S. Application Data
(60) Provisional application No. 60/193,713, filed on Mar. 31, 2000.

(51) Int. Cl.⁷ .............................................. G11B 21/16
(52) U.S. Cl. ...................................................... 360/245
(58) Field of Search .............................. 360/245, 244.2, 360/244.9

(56) References Cited

U.S. PATENT DOCUMENTS

| | | | | |
|---|---|---|---|---|
| 5,198,945 A | * | 3/1993 | Blaeser et al. ............ 360/245.5 |
| 5,313,355 A | * | 5/1994 | Hagen ...................... 360/244.5 |
| H1424 H | * | 4/1995 | Budde ...................... 360/245.5 |
| H1425 H | | 4/1995 | Wolter ......................... 360/104 |
| 5,455,727 A | | 10/1995 | Baral et al. .................. 360/104 |
| H1573 H | | 8/1996 | Budde ......................... 360/104 |
| 5,612,841 A | | 3/1997 | Johnson ...................... 360/104 |
| 5,719,727 A | * | 2/1998 | Budde ...................... 360/244.9 |
| 5,815,348 A | * | 9/1998 | Danielson et al. ........ 360/244.9 |
| 6,014,289 A | * | 1/2000 | Goss ........................ 360/244.1 |
| 6,151,197 A | * | 11/2000 | Larson et al. ............... 360/255 |

* cited by examiner

Primary Examiner—David Davis
(74) Attorney, Agent, or Firm—Westman, Champlin & Kelly

(57) ABSTRACT

A disc drive suspension is provided, which includes a longitudinal axis, a rigid load beam section and a preload transfer section. The rigid load beam section extends along the longitudinal axis and has first and second opposing lateral side edges with respective first and second stiffening rails. The first and second stiffening rails are bent out-of-plane with respect to a main body portion of the rigid load beam section and terminate at a distal end of the rigid load beam section. The preload transfer section extends distally from the distal end of the rigid load beam section and has a third stiffening rail. The third stiffening rail is bent out-of-plane with respect to a main body portion of the preload transfer section and extends longitudinally from the distal end of the rigid load beam section.

18 Claims, 7 Drawing Sheets

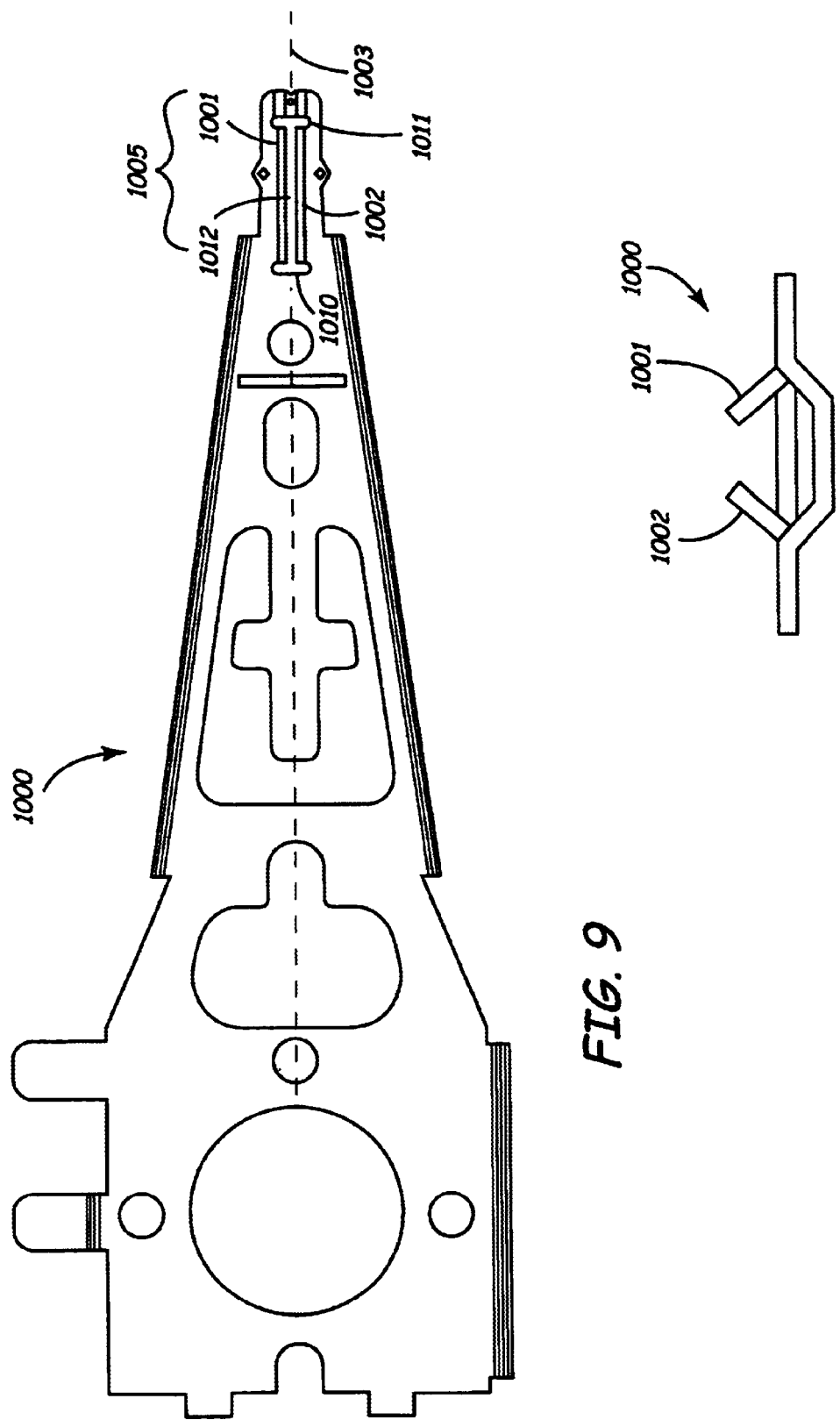

DISC DRIVE SUSPENSION HAVING TIP STIFFENER

CROSS-REFERENCE TO RELATED APPLICATION

This application claims the benefit of U.S. Provisional Application No. 60/193,713, which is entitled "TUNDRA SUSPENSION THE HIGH PERFORMANCE SUSPENSION FOR RESONANCE" and was filed Mar. 31, 2000.

Cross reference is also made to U.S. application Ser. No. 09/631,530, which is entitled "ADHESIVE CONTROL FEATURES FOR DISC DRIVE HEAD SUSPENSION AND FLEX CIRCUIT INTERCONNECT" and was filed Aug. 3, 2000.

FIELD OF THE INVENTION

The present invention relates to disc drive data storage systems and, more particularly, to suspensions for supporting data recording heads.

BACKGROUND OF THE INVENTION

Disc drive data storage systems use rigid discs which are coated with a magnetizable medium for storage of digital information in a plurality of circular, concentric data tracks. The discs are mounted on a spindle motor which causes the discs to spin and the surfaces of the discs to pass under respective disc head sliders. The sliders carry transducers which write information to and read information from the disc surfaces. The slider and transducer are often together referred to as a "head". Each slider is supported by an actuator arm and a suspension. The actuator arms move the sliders from track-to-track across the surfaces of the discs under the control of electronic control circuitry for track following operations.

The suspension connects the actuator arm to the slider. The suspension provides a preload force through a relatively rigid load beam which forces the slider toward the disc surface. Additionally, the suspension is flexible in the slider pitch and roll directions to allow the slider to follow the topography of the disc. This pitch and roll flexibility is obtained from a gimbal or flexure structure, which can be integral with the load beam or a separate piece part that is welded or otherwise attached to the load beam.

The slider includes a hydrodynamic (e.g., air) bearing surface, which faces the disc surface. As the disc rotates, the disc drags air under the slider and along the bearing surface. As the air passes beneath the bearing surface, air compression along the air flow path causes the air pressure between the disc and the bearing surface to increase, which creates a hydrodynamic lifting force that counteracts the load force and causes the slider to fly above or in close proximity to the disc surface.

One of the problems associated with disc drive operation is Non-Repeatable Runout (NRRO) of the Head-Gimbal Assembly (HGA). An important contributor to NRRO of the HGA is slider off-track motion caused by asymmetry in the first bending mode of the HGA. The first bending mode is bending in a direction normal to the disc surface. During manufacture and assembly of the HGA, process tolerances often lead to minor variations in the roll static angle (RSA) of the slider from a desired RSA. These variations are reduced by adjusting the RSA with an adjustment tool. However, these adjustments can lead to asymmetry in the first bending mode of the HGA. Detailed testing has shown a direct correlation between the magnitude of adjustments to the RSA of the slider and HGA NRRO. As the magnitude of the RSA adjustments increases, the off-track component of the first bending mode of the HGA becomes larger, which results in an increased contribution to the NRRO.

One solution to the HGA NRRO problem is to decrease the magnitudes of allowable adjustments to the RSA and to use an improved RSA adjustment tool. However, as the number of tracks per inch and the disc rotational velocities continue to increase in newer disc drive products, the performance requirements within the drive have become more strained. This has caused drastically increased sensitivities within the drive. As a result, the existing solution of limiting the RSA adjust is no longer effective in decreasing NRRO contributions from the suspension.

The present invention provides a solution to this and other problems and offers other advantages over the prior art.

SUMMARY OF THE INVENTION

One aspect of the present invention relates to a disc drive suspension which includes a longitudinal axis, a rigid load beam section and a preload transfer section. The rigid load beam section extends along the longitudinal axis and has first and second opposing lateral side edges with respective first and second stiffening rails. The first and second stiffening rails are bent out-of-plane with respect to a main body portion of the rigid load beam section and terminate at a distal end of the rigid load beam section. The preload transfer section extends distally from the distal end of the rigid load beam section and has a third stiffening rail. The third stiffening rail is bent out-of-plane with respect to a main body portion of the preload transfer section and extends longitudinally from the distal end of the rigid load beam section.

Another aspect of the present invention relates to a disc drive suspension which includes an elongated suspension body that is formed of a single, continuous piece of material. An actuator mounting aperture extends through a proximal end of the suspension body and has a center. A load point is located near a distal end of the suspension body. The suspension body has a length of 0.6 inches to 0.7087 inches from the center of the proximal actuator mounting aperture to the load point, a mass of 40 milligrams to 45 milligrams, a spring rate of 30 gram-force per inch (gmf/in.) to 35 gmf/in., and a first bending mode frequency of at least 2.5 kHz.

Another aspect of the present invention relates to a disc drive suspension which includes first and second stiffening rails extending along opposing lateral side edges of the suspension and terminating prior a distal end of the suspension, and stiffening means formed in the suspension for increasing a stiffness of the suspension distally from the first and second stiffening rails.

BRIEF DESCRIPTION OF THE DRAWINGS

FIG. 9 is a top plan view of a suspension according to an alternative embodiment of the present invention.

FIG. 10 is a distal end view of the suspension shown in FIG. 9.

DETAILED DESCRIPTION OF ILLUSTRATIVE EMBODIMENTS

Figure 1:
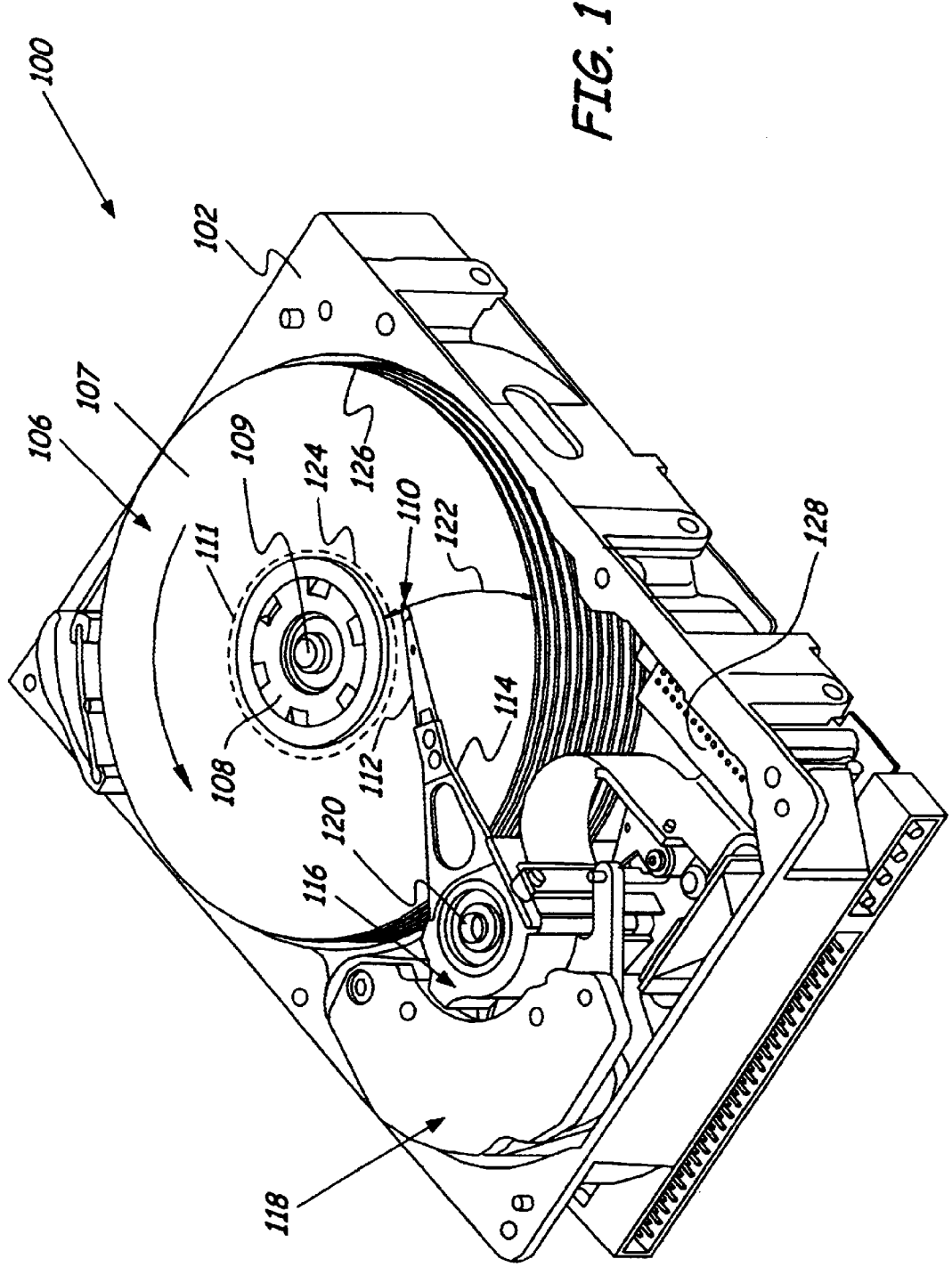
FIG. 1 is a perspective view of a disc drive 100 in which the present invention is useful.

FIG. 1 is a perspective view of a disc drive 100 in which the present invention is useful. Disc drive 100 can be configured as a magnetic disc drive, a magneto-optical disc drive or an optical disc drive, for example. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110 which is mounted to disc drive 100 and carries a read/write head for communication with the disc surface.

In the example shown in FIG. 1, sliders 110 are supported by suspensions 112 which are in turn attached to track accessing arms (or "actuator arms") 114. Track accessing arms 112 are radially positioned by a first-stage actuator 116. Actuator 116 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of servo control circuitry 130. Other types of first-stage actuators can also be used, such as linear actuators.

According to one embodiment of the present invention, each suspension 112 includes a "tip stiffener" for reducing the amplitude of off-track slider motion and thereby the Non-Repeatable Runout (NRRO) that is associated with the first bending mode of the suspension. The first bending mode of the suspension is defined as bending movement in a vertical direction, normal to the surfaces of discs 107. Any asymmetry in the first bending mode of suspensions 112 contributes to undesirable off-track slider motion along path 122. The tip stiffener in each suspension 112 increases the resonant frequency of the first bending mode of that suspension. Since the off-track slider displacement (modal amplitude) is approximately proportional to the inverse of the square of the modal frequency, an increase in the modal frequency causes a reduction in the off-track slider displacement.

Figure 2:
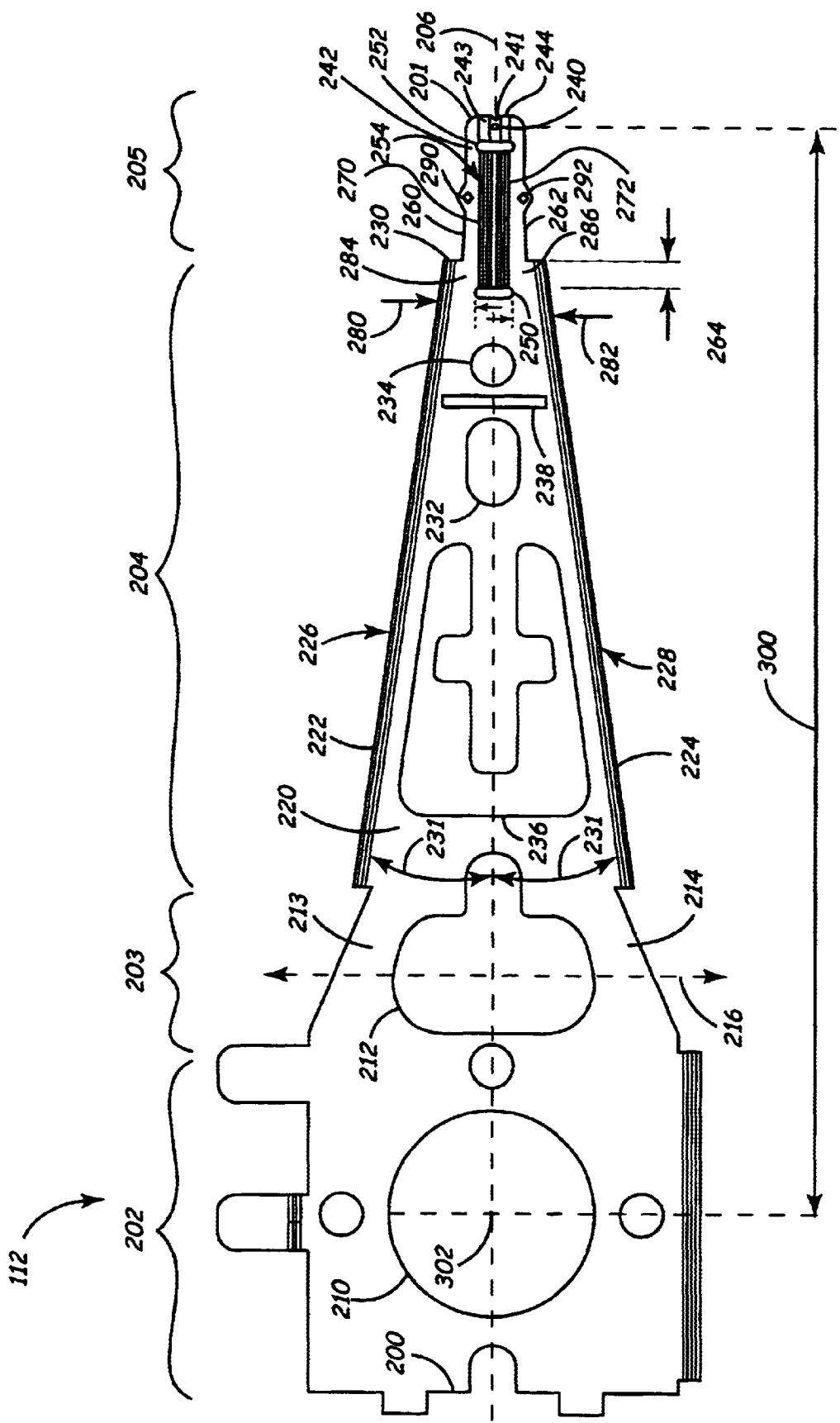
FIG. 2 is a top plan view illustrating a suspension used within the disc drive shown in FIG. 1, according to one embodiment of the present invention.

FIG. 2 is a top plan view illustrating suspension 112 in greater detail, according to one embodiment of the present invention. Suspension 112 is formed of a single, continuous piece of material such as 0.0025 inch thick stainless steel. Other metallic and non-metallic materials can also be used in alternative embodiments and with various thicknesses.

Suspension 112 includes a proximal end 200, a distal end 201, a proximal mounting section 202, a flexible beam section 203, a rigid load beam section 204 and a distal preload transfer section 205. Suspension 112 further includes a longitudinal axis 206, and is generally symmetrical about axis 206. Proximal mounting section 202 includes an actuator mounting aperture 210 for mounting suspension 112 to a respective actuator arm 114 (shown in FIG. 1), such as by ball-staking. Other methods of attachment can also be used. Flexible beam section 203 includes an aperture 212 which defines a pair of flexible beams 213 and 214 that extend from proximal mounting section 202 to rigid load beam section 204. Beams 213 and 214 are formed with a preload bend (not shown) about transverse axis 216. When suspension 112 is assembled in disc drive 100 (shown in FIG. 1), the preload bend supplies a preload force to slider 110 (also shown in FIG. 1) which forces slider 110 toward the surface of the disc.

Rigid load beam section 204 extends from flexible beam section 203 to distal section 205. Rigid load beam section 204 has a substantially planar main body portion 220 and a pair of opposing lateral side edges 222 and 224 with respective stiffening rails 226 and 228. Stiffening rails 226 and 228 are bent out-of-plane with respect to main body portion 220 and terminate at a distal end 230 of rigid load beam section 204. Stiffening rails 226 and 228 provide additional stiffness to rigid load beam section 204, which transfers the preload force generated by beams 213 and 214 to distal section 205. In one embodiment, stiffening rails 226 and 228 converge toward one another as the rails extend toward distal end 230 and are each oriented at an angle 231 of 6 degrees to 8 degrees relative to longitudinal axis 206. However, other angles can be used in alternative embodiments.

Rigid load beam section 204 further includes a pair of alignment holes 232 and 234 which are used for alignment purposes when attaching a gimbal (or "flexure") and slider to the distal end of suspension 112. Alignment hole 232 is also used while attaching suspension 112 to actuator arm 114 shown in FIG. 1. Rigid load beam section 204 also includes two areas 236 and 238 of reduced mass. Areas 236 and 238 are partial-etch areas having a material thickness that is less than the material thickness of main body portion 220. These areas can be formed by a half-etching process, for example. In a half-etching process, the masking patterns on opposed sides of the material to be half-etched do not match. One side of the material in the area to be half-etched is covered by the mask, while the other side of the material is exposed to the etchant. By this method, material is removed from only one side of the material. Control of the etchant strength and exposure time allows the thickness of the material in these half-etched areas to be selectively reduced to a desired thickness.

Area 236 is in the shape of an inverted cross, and area 238 is in the shape of an elongated rectangle that extends perpendicular to longitudinal axis 206 and parallel to transverse axis 216. Reduced mass areas 236 and 238 serve to increase the resonant frequency of the first bending mode of suspension 112, in a direction normal to main body portion 220. Also, areas 236 and 238 help define bonding areas between main body portion 220 and a flex circuit interconnect (shown in FIG. 5). The edges of areas 236 and 236 act as dams which prevent the adhesive that is used for bonding from migrating to other areas along suspension 112. For example, the use of areas 236 and 238 prevents bonding between suspension 112 and the flex circuit near flexible beam section 203, along stiffening rails 226 and 228, and near distal section 205. This allows relative movement between the flex circuit and the suspension along these areas. This movement has been found to dampen a first torsional resonance mode of suspension 112. Also, better control of the bonding area between the flex circuit and suspension 112 helps reduce variation in roll stiffness of suspension 112.

Distal section 205 extends from distal end 230 of rigid load beam section 204 to distal end 201 of suspension 112. Distal section 205 has a load point 240 at which suspension 112 transfers the preload force to the back surface of slider 110 (shown in FIG. 1). Load point 240 is located on a pad 241 that is displaced downward relative to a main body portion 242 of distal section 205 by a pair of bends 243 and 244. The downward displacement of pad 241 allows slider 110 to pitch and roll about load point 240 without causing the flexure (shown in FIGS. 4 and 5) to contact the remainder of suspension 112.

Suspension 112 further includes a pair of apertures 250 and 252 and a stiffening rail 254 extending between the apertures. Aperture 250 is formed near the distal end 230 of rigid load beam section 204, and aperture 252 is located near the distal end of distal section 205. Stiffening rail 254 extends from aperture 250 to aperture 252, along longitudinal axis 206. In the embodiment shown in FIG. 2, stiffening rail 254 is centered laterally along longitudinal axis 206 and is spaced from lateral side edges 260 and 262 of distal section 205. Stiffening rail 254 is bent upwards, out-of-plane from main body portion 242 for providing additional stiffness along distal section 205 to increase the first bending mode resonant frequency of suspension 112. Stiffening rail 254 overlaps stiffening rails 226 and 228 along longitudinal axis 206 for a distance 264. Stiffening rail 254 has first and second lateral side edges 270 and 272 which are contiguous with the main body portions 220 and 242 of rigid load beam section 204 and distal section 205.

Figure 3:
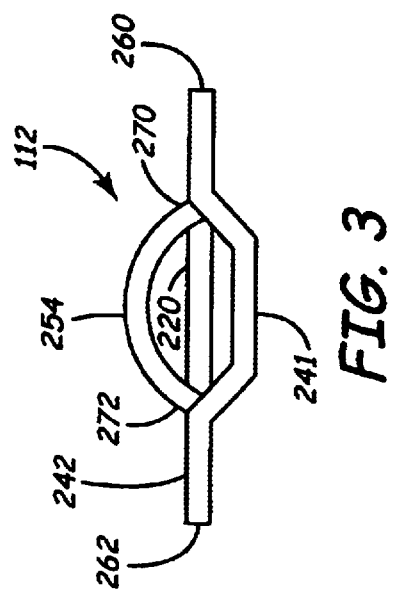
FIG. 3 is a distal end view of the suspension shown in FIG. 2.

FIG. 3 shows the cross-sectional shape of stiffening rail 254 in greater detail, as viewed from distal end 201 of suspension 112. Stiffening rail 254 has a generally U-shaped cross section. This cross-section can have a curved, circular shape as shown in FIGS. 2 and 3, or any other curved or rectilinear shape. For example, stiffening rail 254 can have a rectangular or triangular U-shaped cross-section.

Referring back to FIG. 2, stiffening rail 254 is spaced laterally inward from stiffening rails 226 and 228, as shown by arrows 280 and 282, and from lateral side edges 260 and 262 of distal section 205. Lateral side edges 260 and 262 of distal section 205 are substantially coplanar and contiguous with the main body portion 242 of distal section 205 and with the main body portion 220 of rigid load beam section 204. This forms substantially flat surfaces 284 and 286 extending from the distal end 230 of rigid load beam section 204, between stiffening rail 254 and stiffening rails 226 and 228, and along the first and second side edges 260 and 262 of distal section 205. Flat surfaces 284 and 286 allow convenient routing paths for conductors within the flex circuit that is attached to the top surface of suspension 112, as discussed in more detail below with reference to FIG. 5. Distal section 205 further includes a pair of through-holes 290 and 292 along side edges 260 and 262 for alignment of suspension 112 to the flex circuit shown in FIG. 5.

As the length of a suspension increases and the mass and spring rate of the suspension material decreases, it becomes difficult to achieve a sufficiently high first bending mode resonant frequency. In one embodiment of the present invention, suspension 112 has a length 300 of 0.6 inches to 0.7087 inches as measured from the center 302 of the actuator mounting aperture 210 to load point 240, a mass of 40 milligrams to 45 milligrams, a material spring rate of 30 gram-force per inch (gmf/in.) to 35 gmf/in., and a first bending mode frequency of at least 2.5 kHz. The inventors of the present invention are aware of no other suspension having dimensions and physical properties in the above ranges and having as high of a first bending mode resonant frequency. The present invention is also useful in suspensions having dimensions and properties outside of these ranges.

Figure 4:
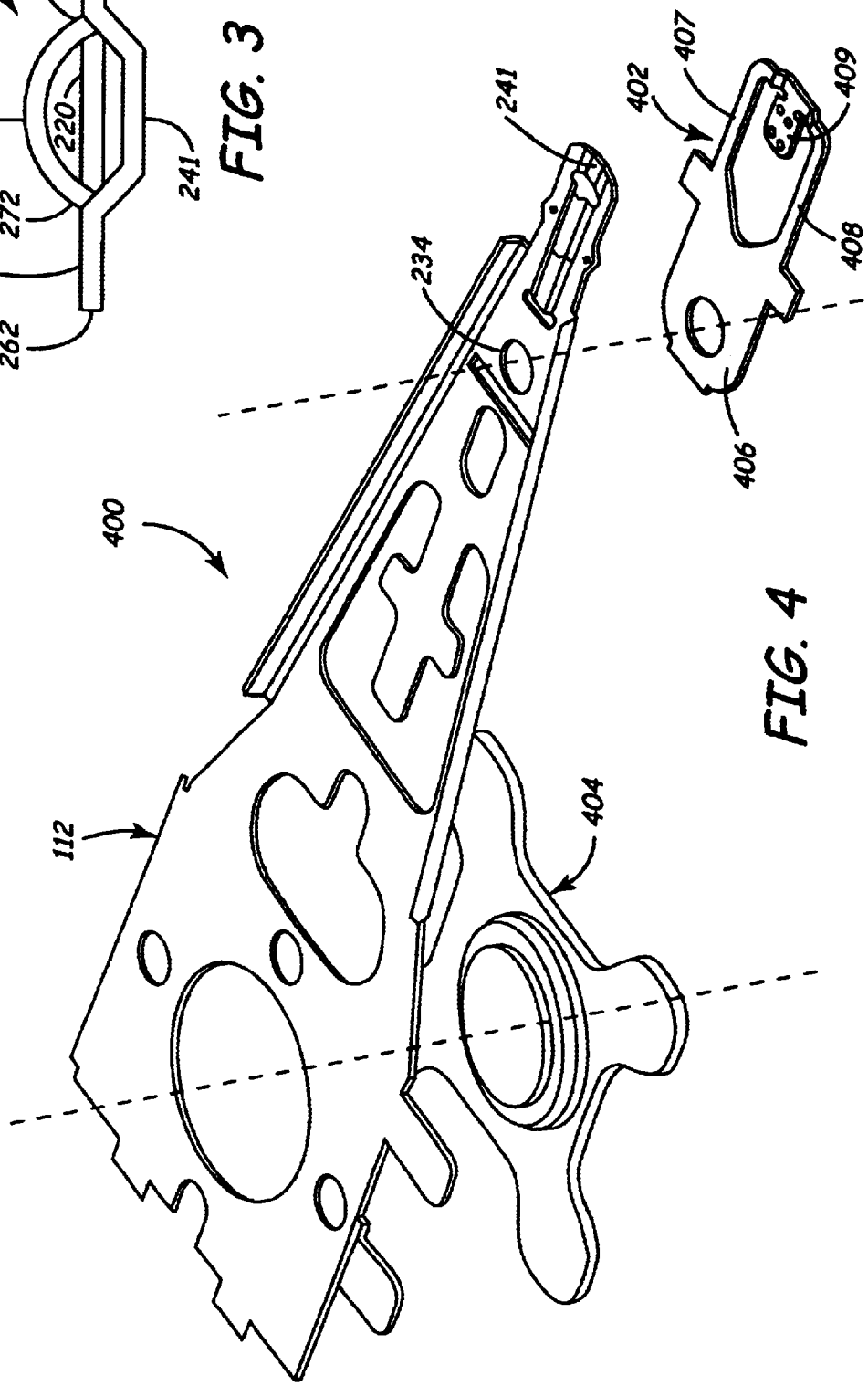
FIG. 4 is an exploded view of a suspension assembly according to one embodiment of the present invention.

FIG. 4 is a perspective, exploded view of a suspension assembly 400 according to one embodiment of the present invention. Suspension assembly 400 includes suspension 112, flexure 402 and base plate 404. Flexure 402 has a proximal section 406, a pair of lateral flexure beams 407 and 408 and a slider mounting pad 409. Proximal section 406 is attached, such as by welding, to the bottom surface of suspension 112, about alignment hole 234. Slider mounting pad 409 provides a lower surface on which to adhere slider 110 (shown in FIG. 1) and an upper surface on which to receive the preload force from pad 241 of suspension 112. Base plate 404 is used for mounting suspension 112 to one of the actuator arms 114, shown in FIG. 1.

Figure 5:
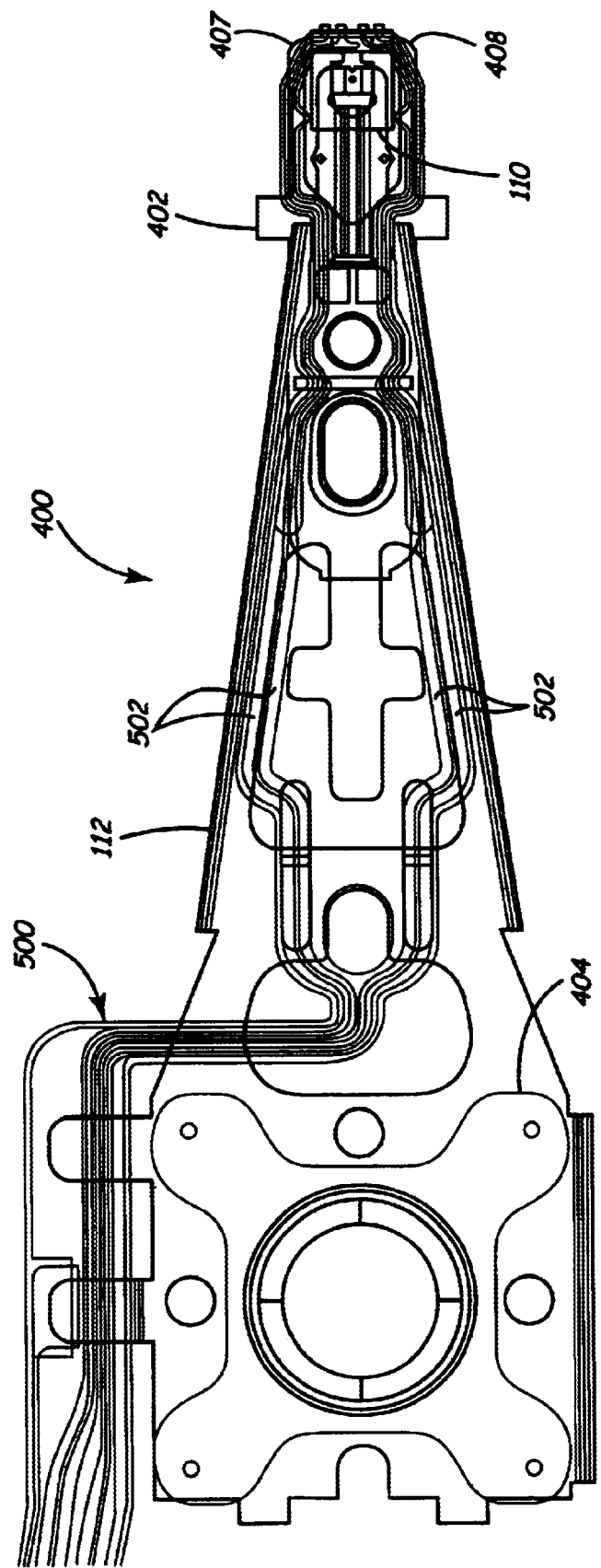
FIG. 5 is a top plan wire frame view of the suspension assembly shown in FIG. 1 in an assembled state, together with a flex circuit.

FIG. 5 is a top plan wire frame view illustrating suspension assembly 400 in an assembled state, together with a flexible interconnect circuit ("flex circuit") 500 adhered to the top surface of suspension 112. In FIG. 5, the outlines of each element in assembly 400 are superimposed on one another. Flex circuit 500 is adhered to the top surface of suspension 112 and has a plurality of electrical conductors 502 for providing electrical connections to the transducing head carried by slider 110. In one embodiment, conductors 502 are adapted to be electrically coupled to electrical contacts located on the trailing edge of slider 110. Alternatively, conductors 502 can be electrically coupled to contacts on other surfaces of slider 110, such as the top surface. The substantially flat, coplanar surfaces 284 and 286 adjacent stiffening rail 254 and along edges 260 and 262 provide a convenient path to route conductors 502 between stiffening rail 254 and stiffening rails 226 and 228 and out over flexure beams 407 and 408 of flexure 402.

Figure 6:
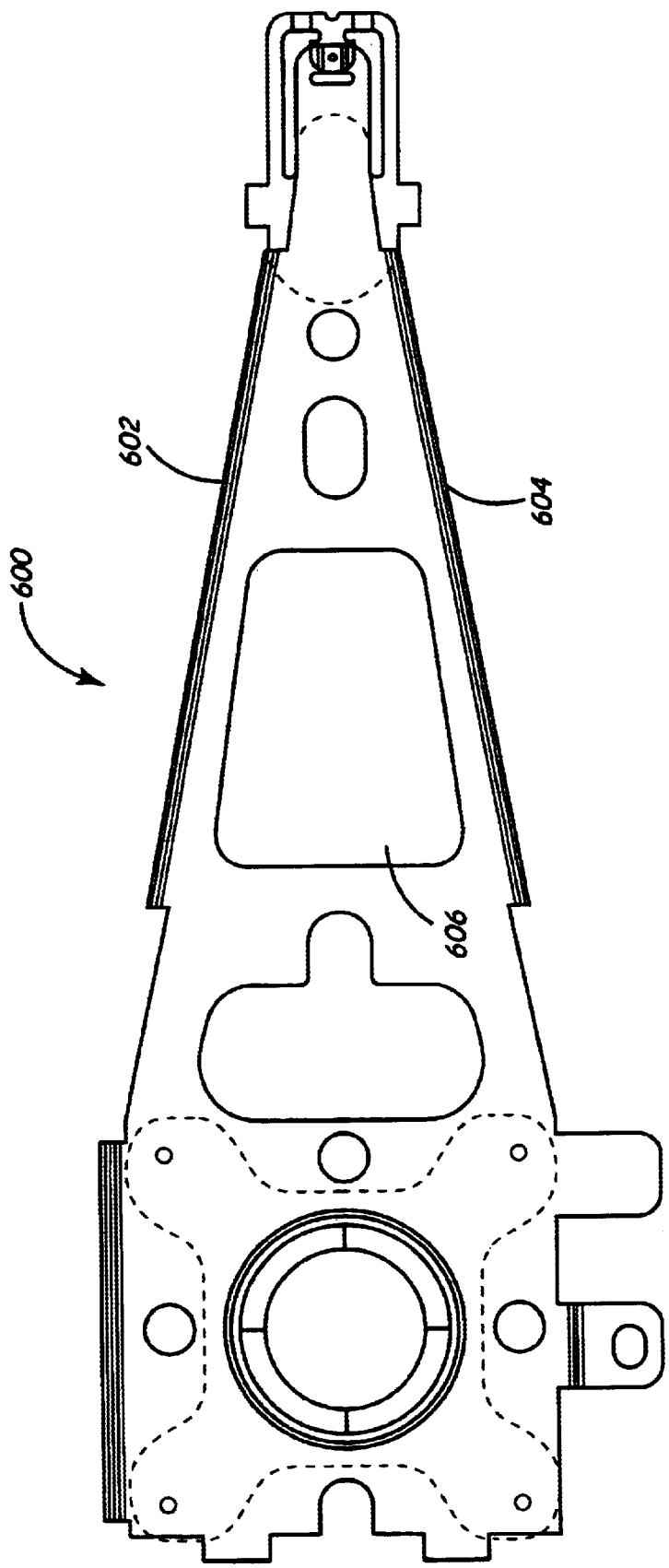
FIG. 6 is a top plan view of a suspension having no tip stiffener, which was used to compare the performance of the suspension shown in FIGS. 2–3.

The performance of suspension 112 was compared to the performance of a similar suspension 600, shown in FIG. 6, which did not include a tip stiffener. Suspension 600 had a pair of stiffening rails 602 and 604 and an area 606 of reduced mass. The material used for suspension 600 had a similar length and spring rate as the material used for suspension 112. Stiffening rails 602 and 604 were each oriented at an angle of 10.5 degrees relative to the longitudinal axis of suspension 600.

Modeled strain energy distributions in the first bending modes of suspension 112 and suspension 600 were obtained through a finite element analysis of each suspension. In suspension 600, it was observed that there was significant strain energy dissipation in the area just forward of stiffening rails 602 and 604. In suspension 112, however, it was observed that the strain energy dissipation in that same area was significantly reduced with the addition of stiffening rail 254. Other design features that also helped increase the modal frequencies of suspension 112 relative to suspension 600 were a narrower rigid beam section, longer stiffening rails 226 and 228 relative to rails 602 and 604, the change in shape of partial etch area 236 and the addition of partial etch area 238 (shown in FIG. 2).

Table 1 shows the modeled frequency response of suspension 112 as compared with that of suspension 600.

TABLE 1

|  | Units | Suspension 112 | Suspension 600 |
|---|---|---|---|
| 1st Bending Mode Frequency | kHz | 2.60 | 1.68 |
| 1st Torsional Mode Frequency | kHz | 4.04 | 3.27 |
| 2nd Bending Mode Frequency | kHz | 6.58 | 6.02 |
| 2nd Torsional Mode Frequency | kHz | 10.23 | 8.17 |
| Sway Frequency | kHz | 14.77 | 13.05 |
| 1st Bending Mode Frequency Ratio Squared | — | 0.42 | 1 |

Looking at the first row in Table 1, suspension 112 had a first bending mode frequency of 2.60 kHz, as compared to a first bending mode frequency of 1.68 kHz for suspension 600. The last row in Table 1 shows the squared ratio of the first bending mode frequency of suspension 112 relative to the first bending mode frequency suspension 600. This squared ratio is an estimate of the reduction in amplitude in the first bending mode due to the increased modal frequency of suspension 112. Thus, suspension 112 is predicted to have a 58% lower amplitude in the first bending mode, which would result in a corresponding reduction in non-repeatable runout (NRRO) associated with the first bending mode of suspension 112.

Table 2 shows results of a shock analysis that was performed with a plurality of suspensions 112 coupled to one E-block arm and a plurality of suspensions 600 coupled to another E-block arm. From Table 2, it is observed that the suspensions 112 had a 30% higher head lift threshold during a non-operating shock event (due to a 0.5 ms half sine dynamic acceleration) as compared to the suspensions 600. This is a result of an increase in the separation between the first bending mode frequency of the E-block arm and the first bending mode frequency of the suspensions 112 coupled to the arm.

Essentially, the first bending mode frequency of the suspensions 112 increased by 52%, while the first bending mode frequency of the E-block arm to which the suspensions were attached remained constant at about 1 kHz.

TABLE 2

|  | Units | Suspension 600 | Suspension 112 |
|---|---|---|---|
| Static Analysis |  |  |  |
| Arm Tip Deflection | (mil/G) | 0.012 | 0.012 |
| HGA Level Head/Disc Separation | (G/gmf) | 143 | 135 |
| E-Block Level Head/Disc Separation | (G/gmf) | 131 | 122 |
| Non-Operating Shock: Worst Case Halfsine |  |  |  |
| Duration | (msec) | 0.79 | 0.78 |
| Arm Tip Deflection | (mil/G) | 0.022 | 0.021 |
| Arm Tip Deflection at 200 G | (mil) | 4.4 | 4.2 |
| Head Lift Threshold at 2.5 gmf Preload | (G) | 216 | 267 |
| Non-Operating Shock: 0.5 ms Halfine |  |  |  |
| Arm Tip Deflection | (mil/G) | 0.020 | 0.020 |
| Arm Tip Deflection at 200 G | (mil) | 3.9 | 3.9 |
| Head Lift Threshold at 2.5 gmf Preload | (G) | 231 | 301 |

In addition to the above-testing, suspension 112 was implemented in a Cheetah X15 disc drive, manufactured by Seagate Technology LLC, for testing purposes. The frequency response of the suspension 112 within the drive was measured at a component level and is shown in Table 3.

TABLE 3

|  | Units |  |
|---|---|---|
| 1st Bending Mode Frequency | kHz | 2.5 |
| 1st Torsional Mode Frequency | kHz | 4.2 |
| 2nd Torsional Mode Frequency | kHz | 11 |
| Sway Frequency | kHz | 13.27 |

The measured data was within 8% of the modeled predictions shown in Table 1, verifying the proposed improvement in the frequency response of suspension 112.

Table 4 shows disc drive level data from engineering model builds of the Cheetah X15 using suspensions similar to suspension 112 and suspensions similar to suspension 600. Table 4 compares the NRRO (which is a measure of slider off-track motion) of suspensions 112 and suspensions 400.

TABLE 4

|  | Mean 3 Sigma NRRO (uin) | Max 3 Sigma NRRO (uin) | Mean 3 Sigma RO (uin) | Max 3 Sigma RO (uin) |
|---|---|---|---|---|
| Suspensions 112 | 3.60 | 6.00 | 5.60 | 9.00 |
| Suspensions 600 | 7.00 | 16.00 | 9.50 | 18.40 |

From Table 4, it is seen that suspensions 112 performed significantly better than suspensions 600 in the Cheetah X15 engineering model drives. Disc drives with suspensions 112 had approximately 62.5% lower maximum 3 sigma NRRO and 52% lower maximum total runout (RO). Thus, suspensions 112 were successfully able to reduce the slider off-track motion in the model disc drives.

Similar results were obtained from windage tests comparing several individual suspensions 112 with several individual suspensions 600. The windage testing was performed on a component level by placing each suspension between two co-rotating discs to thereby simulate a disc drive environment. The out-of-plane motion of each suspension was measured with a laser doppler velocimetry (LDV) sensor. Excitation of each suspension was purely from the wind flow between the co-rotating discs, and no external excitation was applied.

Figure 7:
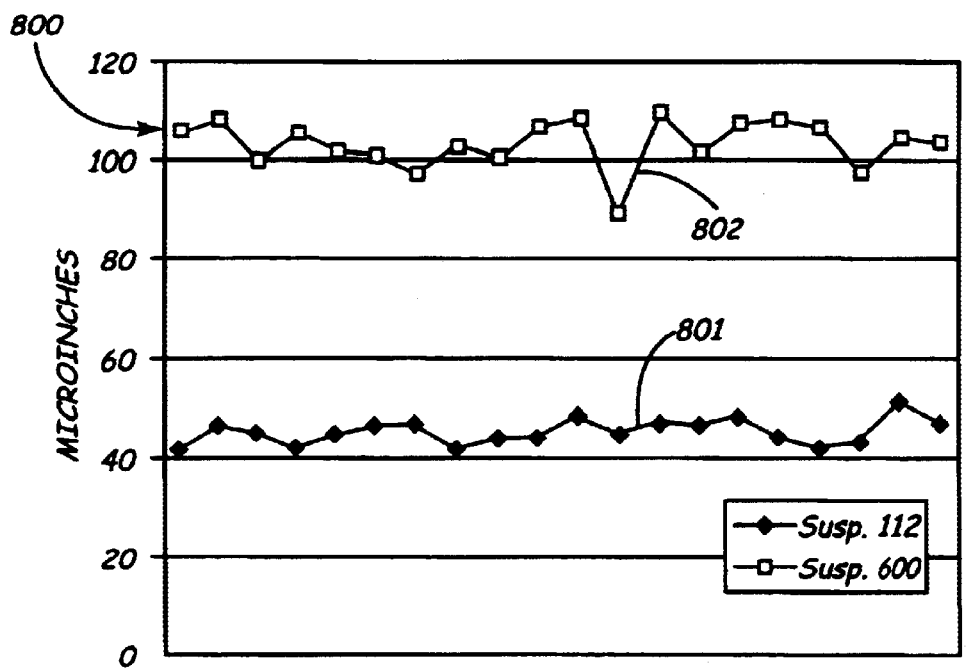
FIG. 7 is a graph illustrating a comparison of the three sigma displacements between the suspensions shown in FIGS. 2 and 6 for all frequencies greater than 1.2 kHz.

FIG. 7 shows a comparison of the three sigma displacement between suspensions 112 and suspensions 600 for all frequencies greater than 1.2 kHz. Axis 800 represents displacement in microinches. Line 801 is a plot of the three sigma displacement of each suspension 112. Line 802 is a plot of the three sigma displacement of each suspension 600. Each point on lines 801 and 802 represents a single suspension. FIG. 7 clearly demonstrates that the displacement in suspensions 112 is significantly lower than the displacement observed in suspensions 600.

Figure 8:
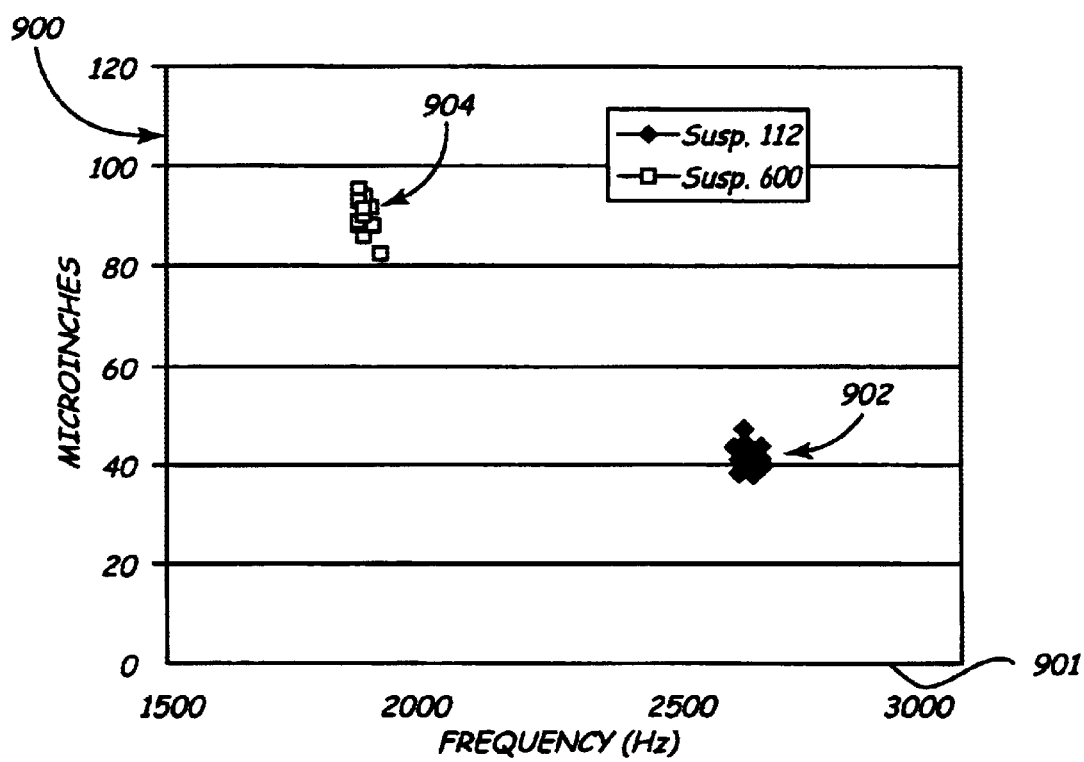
FIG. 8 is a graph illustrating suspension displacements in the first bending mode for the suspensions shown in FIGS. 2 and 6.

FIG. 8 is a graph illustrating suspension displacements in the first bending mode. Axis 900 represents displacement in microinches, and axis 901 represents frequency in Hertz.

FIG. 8 shows the displacements 902 and 903 of a plurality of suspensions 112 and a plurality of suspensions 600, respectively, within a 200 Hertz band centered at the first bending frequency of each suspension. The average displacement 904 for suspensions 600 was 90.28 microinches, while the average displacement 902 for suspensions 112 was 41.48 microinches. Thus, the suspension displacement in the first bending mode for suspensions 112 was 54% lower than that of suspensions 600. These results are within 4% of the predicted reduction shown in Table 1.

FIG. 9 is a top plan view of a suspension 1000 according to an alternative embodiment of the present invention. FIG. 10 is an end view of suspension 1000, as viewed from a distal end of the suspension. Suspension 1000 is similar to suspension 112, shown in FIG. 2, but has an alternative tip stiffener formed by a pair of stiffening rails 1001 and 1002 extending longitudinally along longitudinal axis 1003. Stiffening rails 1001 and 1002 are each bent upwards, out-of-plane from main body portion 1004 of distal section 1005. Stiffening rails 1001 a d 1002 are defined by cut-outs 1010, 1011 and 1012. Cut-out 1012 extends from cut-out 1010 to cut-out 1011. Stiffening rails 1001 and 1002 are spaced from one another about longitudinal axis 1003. Other types of stiffening rails and rail geometries can also be used in alternative embodiments of the present invention.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the suspension while maintaining substantially the same functionality without departing from the scope and spirit of the present invention. In addition, although the embodiments described herein are directed to a suspension for a rigid disc drive system, it will be appreciated by those skilled in the art that the teachings of the present invention can be applied to other systems, like floppy disc drive systems, tape drive systems, and other data storage systems such as magnetic, optical or magneto-optical card readers, without departing from the scope and spirit of the present invention.

What is claimed is:

1. A suspension comprising:

a longitudinal axis;

a rigid load beam section extending longitudinally along the longitudinal axis and having first and second opposing lateral side edges with respective first and second stiffening rails which are bent out-of-plane with respect to a main body portion of the rigid load beam section and terminate at a distal end of the rigid load beam section; and a preload transfer section extending distally from the distal end of the rigid load beam section and having a third stiffening rail comprising a longitudinal bend, which is bent with respect to a main body portion of the preload transfer section and extends longitudinally from a location proximal to the distal end of the rigid load beam section to a location distal to the distal end of the rigid load beam section such that the longitudinal bend at least partially overlaps the first and second stiffening rails along the longitudinal axis.

2. The suspension of claim 1 wherein:

the preload transfer section has first and second lateral side edges extending from the distal end of rigid load beam section; and the third stiffening rail is centered laterally along the longitudinal axis and is spaced from the first and second lateral side edges of the preload transfer section.

3. The suspension of claim 2 wherein:

the third stiffening rail is spaced laterally inward from the first and second stiffening rails at the distal end of the rigid beam section; and the first and second side edges of the preload transfer section are substantially coplanar and contiguous with the main body portion of the rigid load beam section and the preload transfer section so as to form a substantially flat surface extending from the distal end of the rigid load beam section, between the third stiffening rail and the first and second stiffening rails, and along the first and second side edges of the preload transfer section.

4. The suspension of claim 1 wherein the suspension further comprises:

a first cut-out within the main body portion of the rigid load beam section and laterally centered along the longitudinal axis; and a second cut-out within the main body portion of the preload transfer section and laterally centered along the longitudinal axis, wherein the third stiffening rail extends from the first cut-out to the second cut-out.

5. The suspension of claim 4 wherein the third stiffening rail has a generally U-shaped cross-section in a direction transverse to the longitudinal axis and has first and second lateral side edges that are contiguous with the main body portions of the rigid load beam section and the preload transfer section.

6. The suspension of claim 4 and further comprising:

a third cut-out extending longitudinally between and open to the first and second cut-outs, wherein the third stiffening rail extends longitudinally along a first lateral side edge of the third cut-out; and a fourth stiffening rail extending longitudinally along a second lateral side edge of the third cut-out.

7. The suspension of claim 1 the rigid load beam section further comprises:

a first material thickness along the main body portion of the rigid load beam section;

an area of reduced mass within the main body portion of the rigid load beam section along the longitudinal axis and having a second material thickness that is less than the first material thickness.

8. The suspension of claim 7 wherein the area of reduced mass has an inverted cross shape.

9. The suspension of claim 1 wherein:

the suspension further comprises a proximal mounting section having an actuator mounting aperture, which is positioned along the longitudinal axis and has a center, and a flexible beam section extending from the proximal mounting section to the rigid beam section;

the preload transfer section has a load point; and the suspension has a length of 0.6 inches to 0.7087 inches from the center of the actuator mounting aperture to the load point, a mass of 40 milligrams to 45 milligrams, a material spring rate of 30 gram-force per inch (gmf/in.) to 35 gmf/in., and a first bending mode frequency of at least 2.5 kHz.

10. The suspension of claim 1 wherein the first and second stiffening rails converge toward one another as the rails extend toward the distal end and are each oriented at an angle of 6 degrees to 8 degrees relative to the longitudinal axis.

11. A disc drive suspension comprising:

an elongated suspension body which is formed of a single, continuous piece of material;

a longitudinal axis;

a proximal mounting section, which comprises an actuator mounting aperture having a center;

a rigid load beam section having first and second stiffening rails and a distal end;

a preload transfer section extending distally from the distal end of the rigid load beam section and having a third stiffening rail comprising a longitudinal bend, which extends longitudinally from a location proximal to the distal end of the rigid load beam section to a location distal to the distal end of the rigid load beam section such that the longitudinal bend at least partially overlaps the first and second stiffening rails along the longitudinal axis; and a load point located on the preload transfer section, wherein the suspension body has a length of 0.6 inches to 0.7087 inches from the center of the actuator mounting aperture to the load point, a mass of 40 milligrams to 45 milligrams, a spring rate of 30 gram-force per inch (gmf/in.) to 35 gmf/in., and a first bending mode frequency of at least 2.5 kHz.

12. The disc drive suspension of claim 11 and further comprising:

a flexible beam section extending longitudinally from the proximal mounting section to the rigid load beam section.

13. The disc drive suspension of claim 12 wherein:

the preload transfer section has first and second lateral side edges extending from the distal end of rigid load beam section; and the third stiffening rail is centered laterally along the longitudinal axis and is spaced from the first and second lateral side edges of the preload transfer section.

14. The disc drive suspension of claim 13 wherein:

the third stiffening rail is spaced laterally inward from the first and second stiffening rails at the distal end of the rigid beam section; and the first and second side edges of the preload transfer section are substantially coplanar and contiguous with a main body portion of the rigid load beam section and the preload transfer section so as to form a substantially flat surface extending from the distal end of the rigid load beam section, between the third stiffening rail and the first and second stiffening rails, and along the first and second side edges of the preload transfer section.

15. The disc drive suspension of claim 12 wherein the suspension further comprises:

a first cut-out within a main body portion of the rigid load beam section and laterally centered along the longitudinal axis; and a second cut-out within the main body portion of the preload transfer section and laterally centered along the longitudinal axis, wherein the third stiffening rail extends from the first cut-out to the second cut-out and has a generally U-shaped cross-section in a direction transverse to the longitudinal axis and has first and second lateral side edges that are contiguous with the main body portions of the rigid load beam section and the preload transfer section.

16. The disc drive suspension of claim 12 the rigid load beam section further comprises:

a first material thickness along a main body portion of the rigid load beam section; and an area of reduced mass within the main body portion of the rigid load beam section along the longitudinal axis and having a second material thickness that is less than the first material thickness.

17. The disc drive suspension of claim 12 wherein the first and second stiffening rails converge toward one another as the rails extend toward the distal end and are each oriented at an angle of 6 degrees to 8 degrees relative to the longitudinal axis.

18. A suspension comprising:

first and second stiffening rails which extend along opposing lateral side edges of the suspension and terminate prior a distal end of the suspension;

a load point positioned between a distal end of the first and second stiffening rails and the distal end of the suspension for providing a load force to a transducer; and stiffening means formed in the suspension, which comprises a longitudinal bend extending from a location proximal to the distal end of the first and second stiffening rails to a location distal of the distal end of first and second stiffening rails such that the longitudinal bend at least partially overlaps the first and second stiffening rails along longitudinal axis of the suspension, for increasing a stiffness of the suspension distally, between the distal end of the first and second stiffening rails and the load point.

* * * * *